No. 759,118. Patented May 3, 1904.

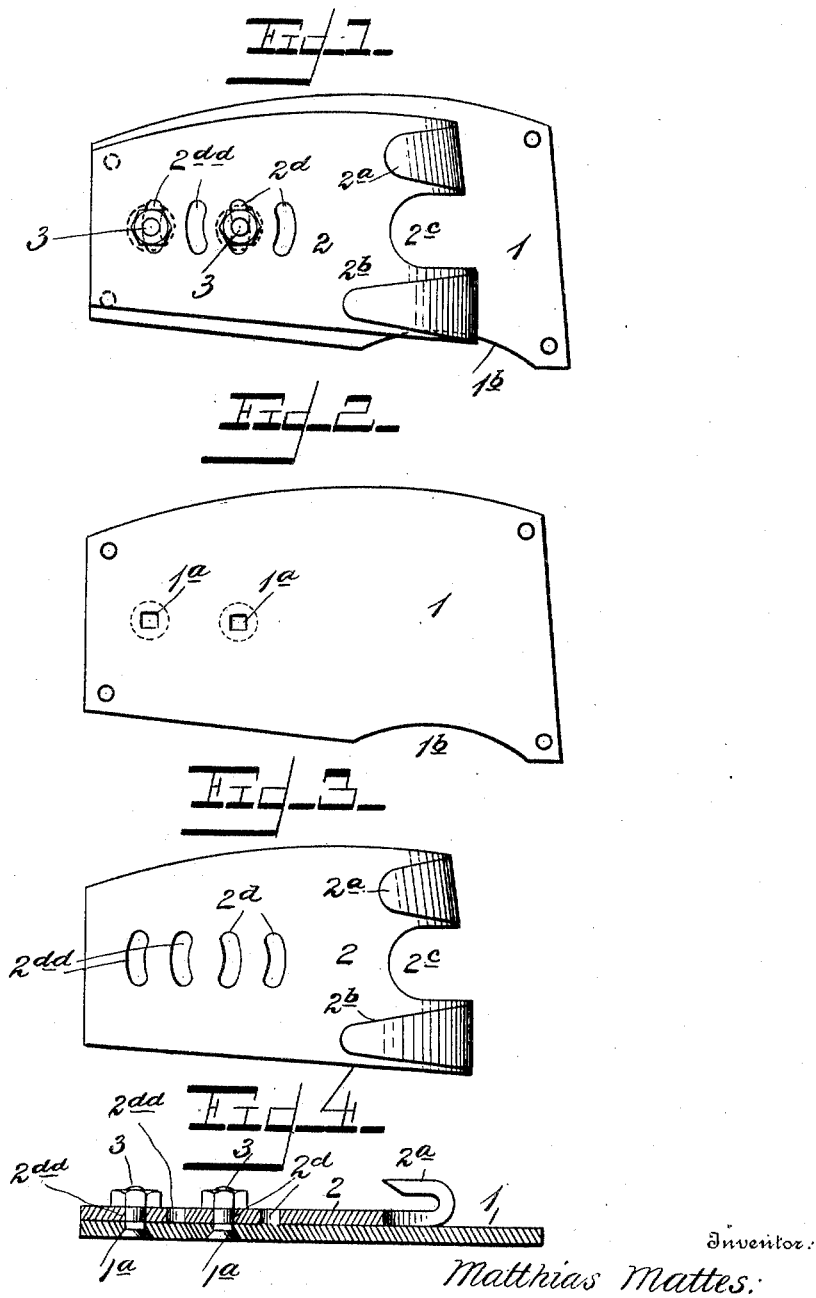

UNITED STATES PATENT OFFICE.

MATTHIAS MATTES, OF IOWA CITY, IOWA.

CORN-HUSKER.

SPECIFICATION forming part of Letters Patent No. 759,118, dated May 3, 1904.

Application filed January 15, 1904. Serial No. 189,188. (No model.)

*To all whom it may concern:*

Be it known that I, MATTHIAS MATTES, a citizen of the United States, residing at Iowa City, in the county of Johnson and State of Iowa, have invented new and useful Improvements in Corn-Huskers, of which the following is a specification.

My invention relates to improvements in what may be termed "corn-huskers," more especially implements for the husking of corn by hand as contradistinguished from machines used for that purpose.

It has for its object principally to effect the corn-husking operation readily and effectively and to provide for the ready adjustment of the husker as may be required for the most advantageous presentation thereof to the ears of corn, as in carrying out said corn-husking operation.

It consists of certain structural features as relate to the individual parts of the invention, substantially as hereinafter more fully disclosed by the following description and specifically pointed out by the claim concluding the latter.

In the accompanying drawings, illustrating the preferred embodiment of my invention, Figure 1 is a plan of the same, viewed as it would appear applied to the hand or resting in the palm thereof presented upward. Fig. 2 is a detached plan view of the member or plate placed directly next to the palm of the hand. Fig. 3 is a like view of the outer or hook-equipped member or plate. Fig. 4 is a central longitudinal section taken through Fig. 1.

In the practicing of my invention I employ two plates or members 1 and 2, one, 1, being more particularly adapted for application and securing directly to the palm of the hand, the holes shown therein being designed to aid in connecting means to said plates with that end in view. Said plate 1 is conformed, as at $1^b$, to the hand about at the base of the thumb to provide for the proper or more effective fitting of said plate or member to the hand. The second plate or member 2, shorter somewhat than the member or plate 1, to which it is connected or applied, as presently explained, has its inner end provided or equipped with preferably a relatively short hook or tooth $2^a$ and a long hook or tooth $2^b$ for engaging and detaching the husks from the ear of corn, as in performing the husking operation, the long tooth or hook being arranged adjacently to the inner edge of the hand for greater efficiency in effecting such removal of said husks. Said plate or member 2 at said inner end is preferably notched or cut away, as at $2^c$, intermediately of the hooks or teeth $2^a 2^b$, permitting the latter to have more or less resiliency in effecting said husking operation. Said plate or member 2 has also a number or series of preferably arcuate or curved slots $2^d 2^{dd}$ produced therethrough in about its longitudinal center, those designated by $2^d$ having their concavities presented or facing the corresponding surfaces or outlines of those designated by $2^{dd}$. Said slots receive nutted bolts 3, having angular shanks passed through corresponding apertures $1^d$ in the plate or member 1 and whose heads are let into countersinks around the holes made in said plate for that purpose. By this arrangement the plate or member 2 may be adjusted or disposed in any required position necessary for changing the angle of presentation of the husking hooks or teeth to the ear of corn as circumstances may suggest to aid the more advantageous husking of the corn. Also such adjustment of parts provides for accommodating the husker to the size or capacity of the hand using the same, as is apparent.

It is obvious that the aforesaid arrangement may be modified by producing the slots $2^d 2^{dd}$ in the plate 1 and the angular apertures $1^c$ in the plate 2 in lieu of providing the plate 2 with the former and the plate 1 with the latter, as shown.

Latitude is allowed as to details herein, as they may be changed as circumstances suggest without departing from the spirit of my invention and the latter still be protected.

I claim—

A corn-husker having a member or plate provided with a short hook and a long hook at one end, and with oppositely-curved slots in its longitudinal center, and a second member or plate provided with nutted adjusting-bolts engaging said slots.

In testimony whereof I have signed my name to this specification in the presence of two subscribing witnesses.

MATTHIAS MATTES.

Witnesses:
 IRA CURTIS,
 A. M. SHAFF.